Figure 1:
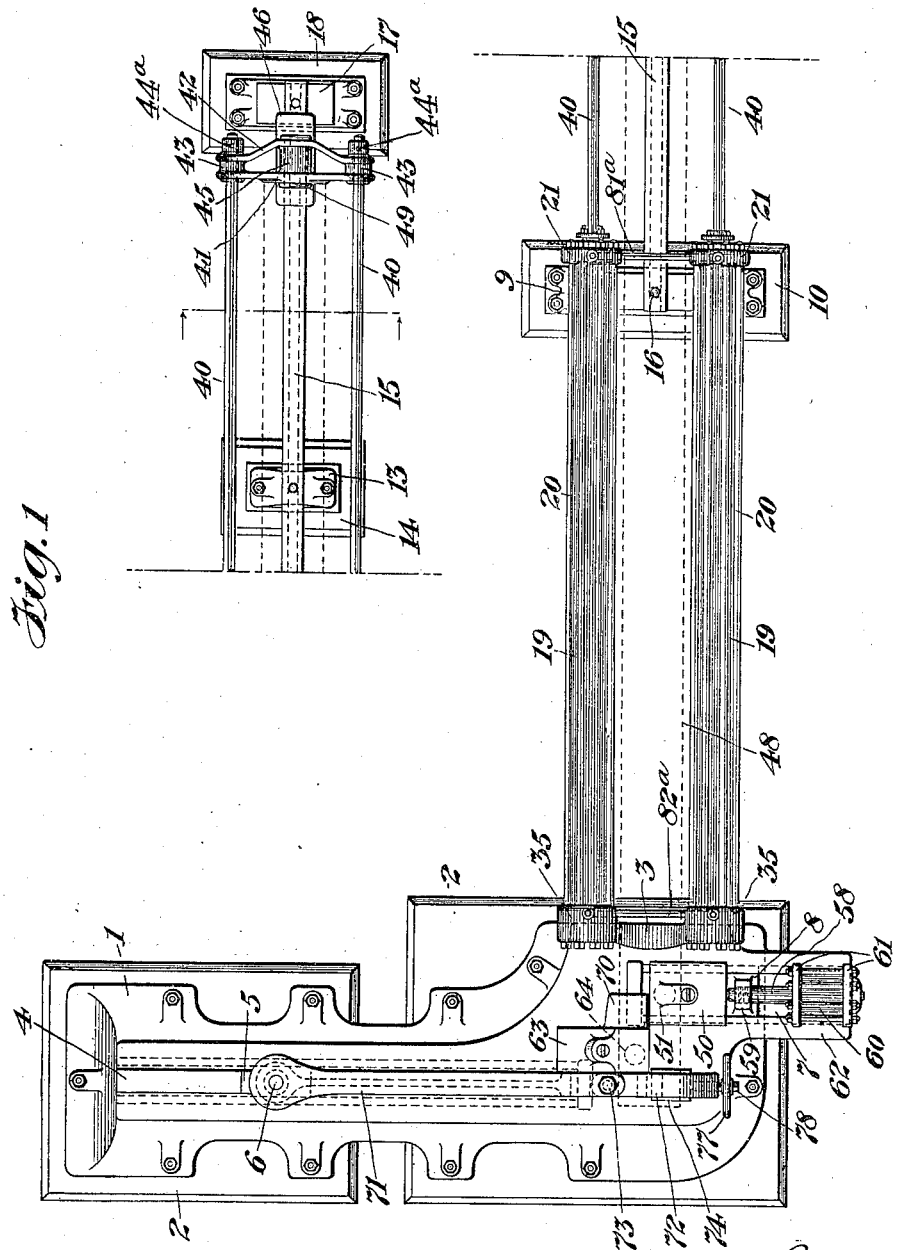

G. H. REYNOLDS, DEC'D.
A. E. REYNOLDS, ADMINISTRATRIX.
TUBE BENDING APPARATUS.
APPLICATION FILED JUNE 13, 1907.

995,568.

Patented June 20, 1911.

9 SHEETS—SHEET 1.

Witnesses:
Chas. F. Clagett
M. Hershovitz

George H. Reynolds
Inventor

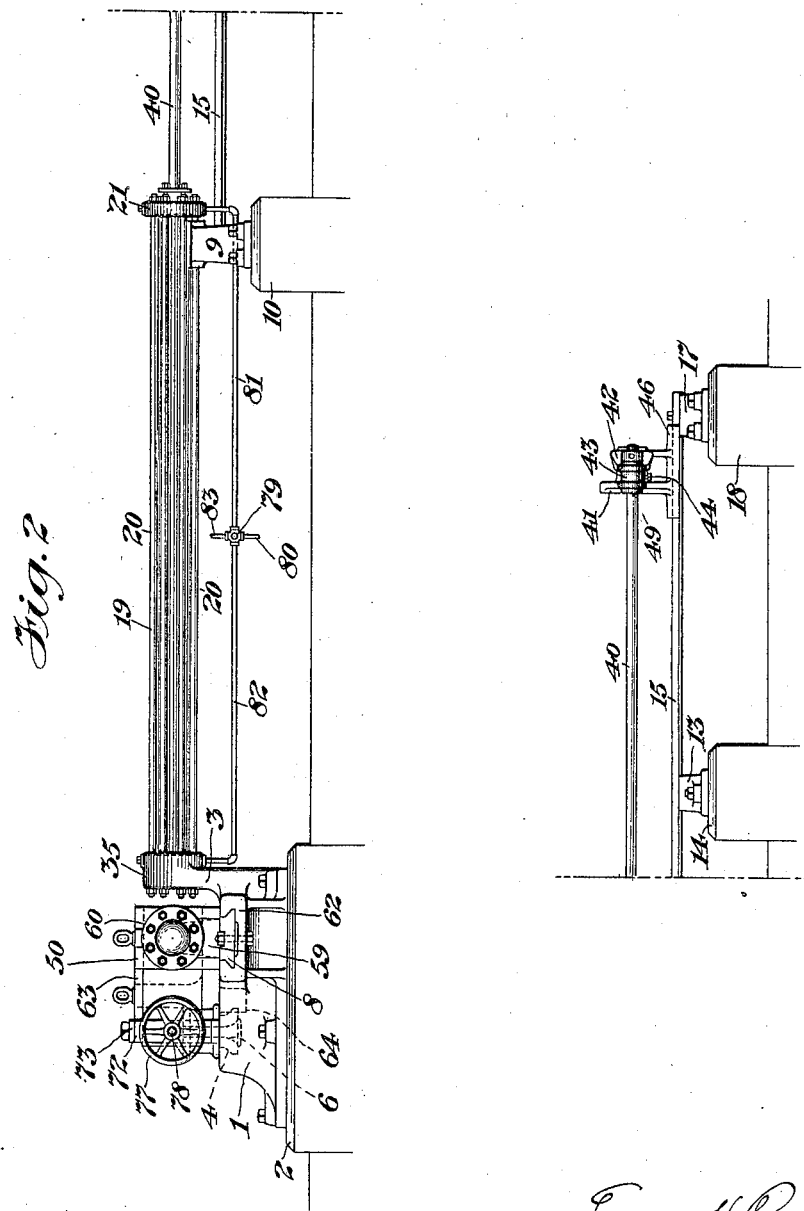

G. H. REYNOLDS, DEC'D.
A. E. REYNOLDS, ADMINISTRATRIX.
TUBE BENDING APPARATUS.
APPLICATION FILED JUNE 13, 1907.
995,568.
Patented June 20, 1911.
9 SHEETS—SHEET 3.
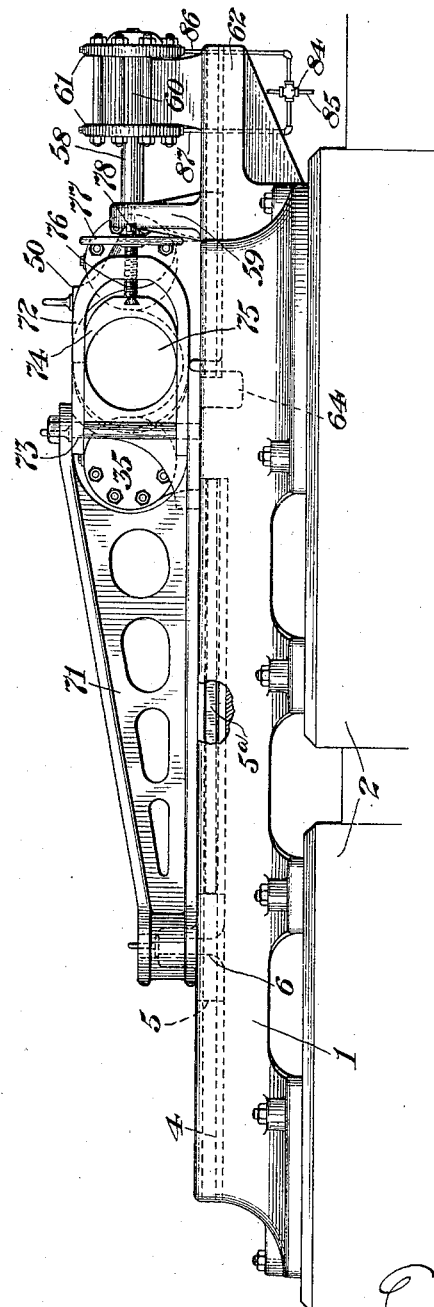

G. H. REYNOLDS, DEC'D.
A. E. REYNOLDS, ADMINISTRATRIX.
TUBE BENDING APPARATUS.
APPLICATION FILED JUNE 13, 1907.
995,568.
Patented June 20, 1911.
9 SHEETS—SHEET 4.
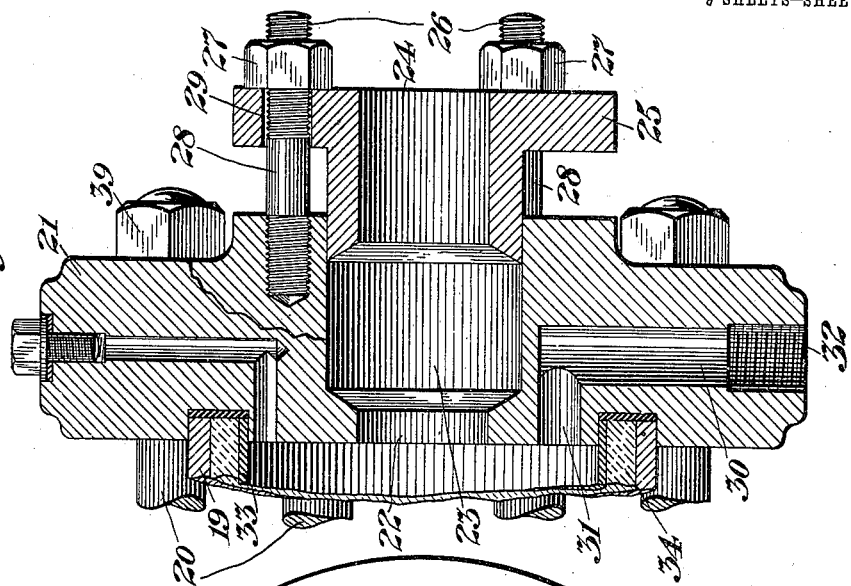
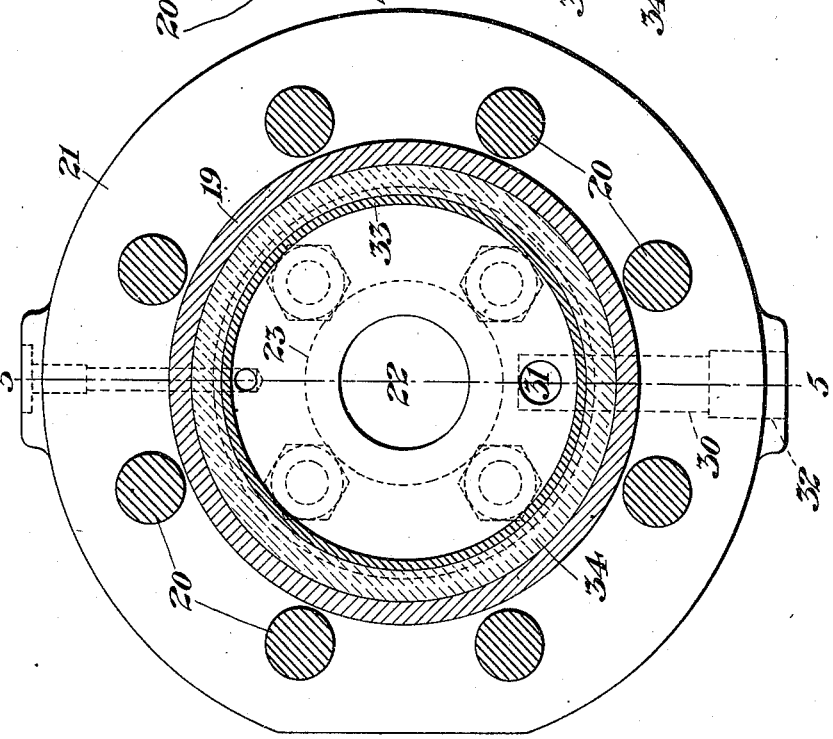

G. H. REYNOLDS, DEC'D.
A. E. REYNOLDS, ADMINISTRATRIX.
TUBE BENDING APPARATUS.
APPLICATION FILED JUNE 13, 1907.
995,568.
Patented June 20, 1911.
9 SHEETS—SHEET 5.
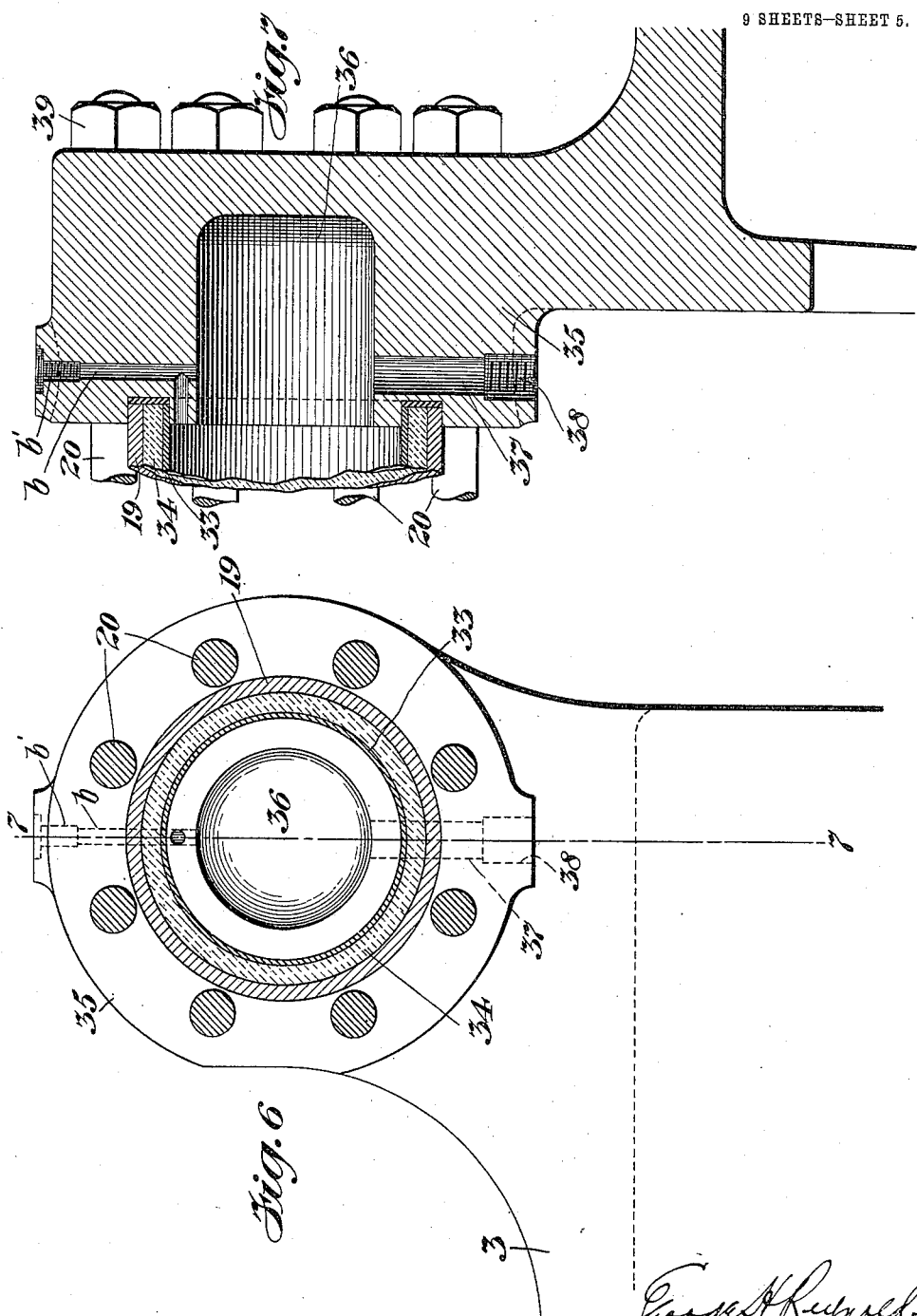

G. H. REYNOLDS, DEC'D.
A. E. REYNOLDS, ADMINISTRATRIX.
TUBE BENDING APPARATUS.
APPLICATION FILED JUNE 13, 1907.
995,568.
Patented June 20, 1911.
9 SHEETS—SHEET 6.
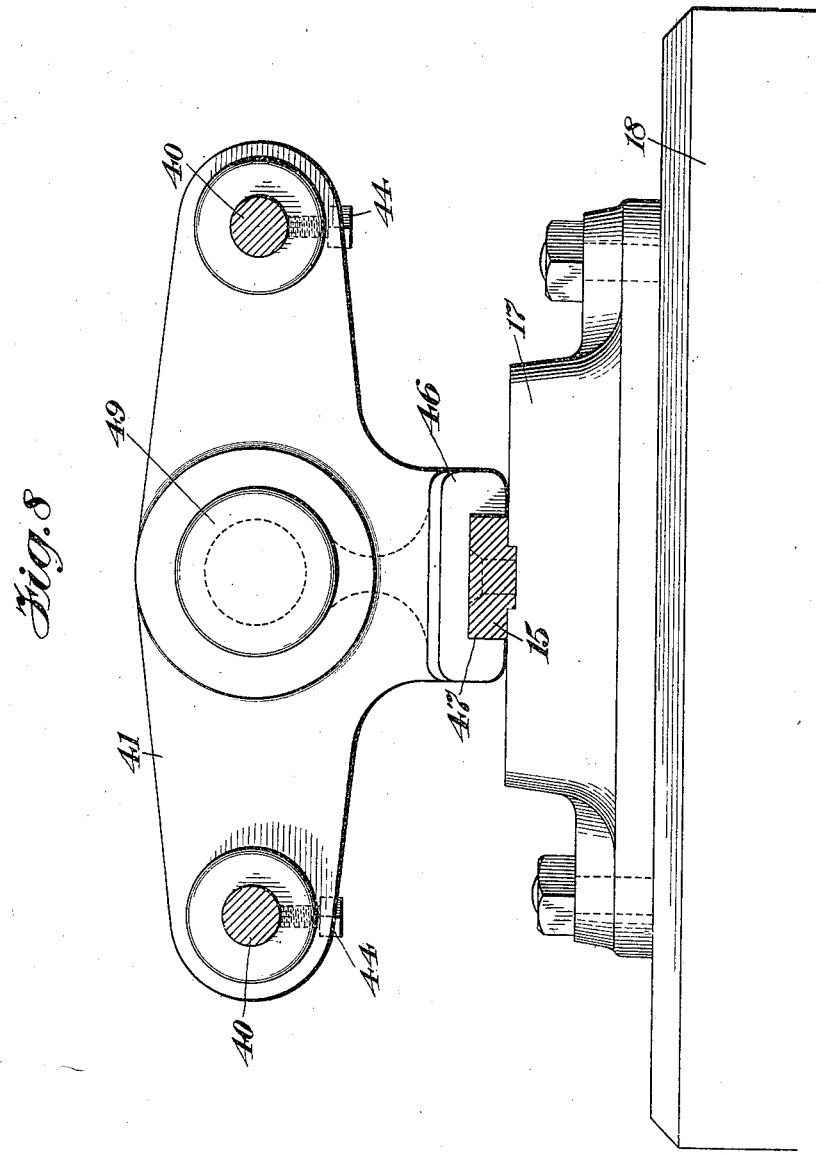

G. H. REYNOLDS, DEC'D.
A. E. REYNOLDS, ADMINISTRATRIX.
TUBE BENDING APPARATUS.
APPLICATION FILED JUNE 13, 1907.
995,568.
Patented June 20, 1911.
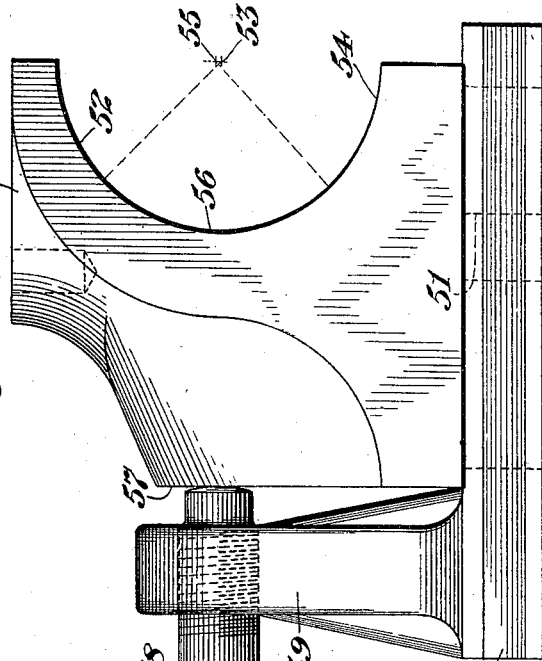
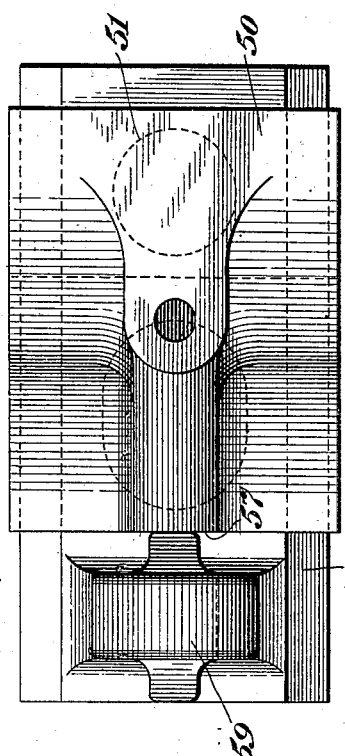
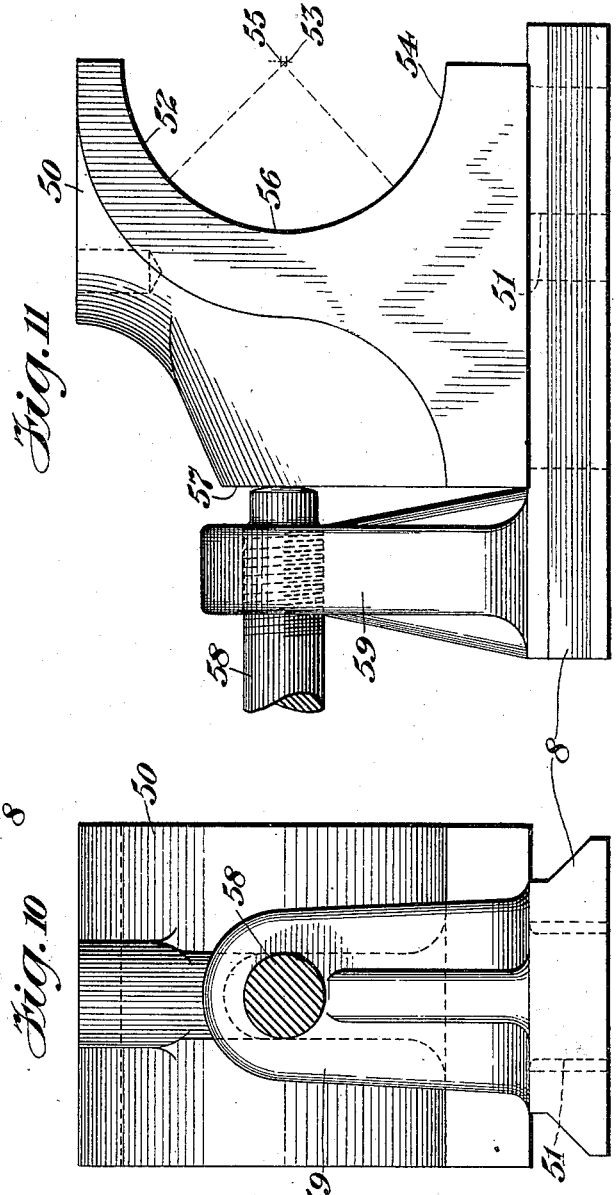

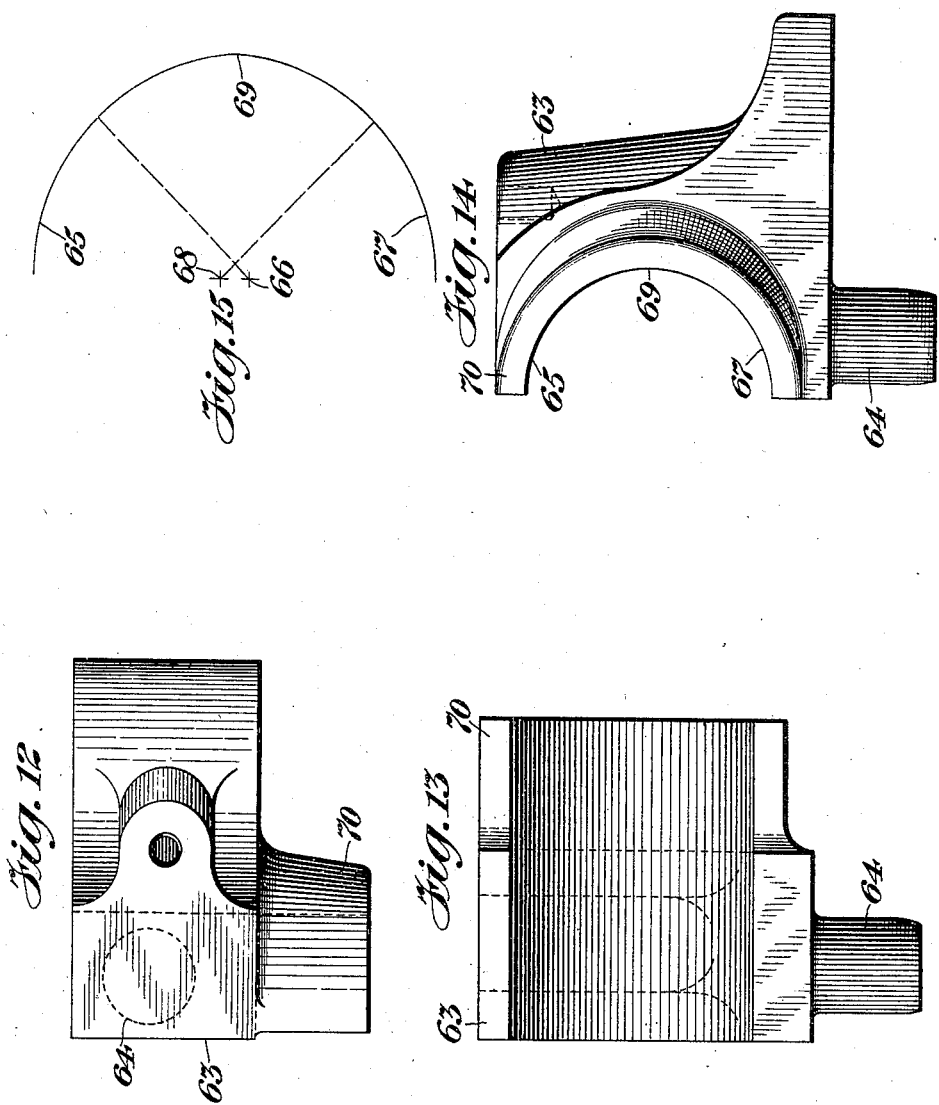

G. H. REYNOLDS, DEC'D.
A. E. REYNOLDS, ADMINISTRATRIX.
TUBE BENDING APPARATUS.
APPLICATION FILED JUNE 13, 1907.
995,568.
Patented June 20, 1911.
9 SHEETS—SHEET 9.
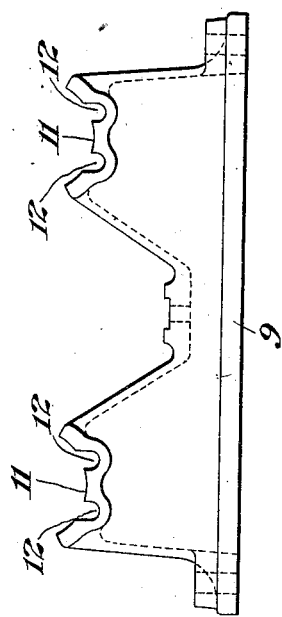
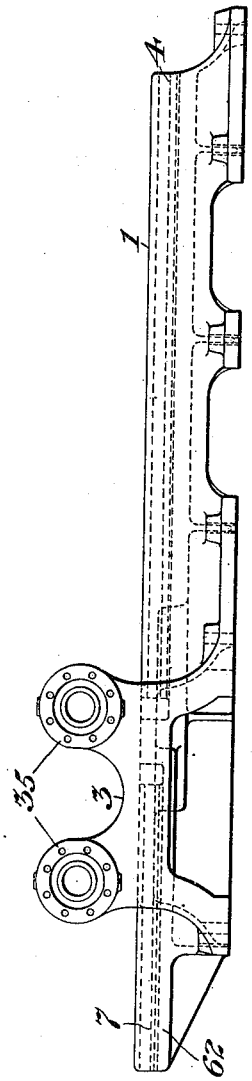

UNITED STATES PATENT OFFICE.

GEORGE H. REYNOLDS, OF MANSFIELD DEPOT, CONNECTICUT; ABBY E. REYNOLDS, ADMINISTRATRIX OF SAID GEORGE H. REYNOLDS, DECEASED, ASSIGNOR TO GENERAL FIRE EXTINGUISHER COMPANY, A CORPORATION OF NEW YORK.

TUBE-BENDING APPARATUS.

995,568.      Specification of Letters Patent.      Patented June 20, 1911.

Application filed June 13, 1907. Serial No. 378,684.

*To all whom it may concern:*

Be it known that I, GEORGE H. REYNOLDS, a citizen of the United States, residing in Mansfield Depot, county of Tolland, and State of Connecticut, have invented a new and useful Improvement in Tube-Bending Apparatus, of which the following is a description.

This invention relates to tube bending apparatus, and has particular reference to apparatus capable of bending metal tubes of varying sizes.

Among the objects of my invention may be noted the following: to provide an apparatus by means of which metal tubes may be bent without cracking or fracturing the same; to provide an apparatus by means of which metal tubes may be automatically bent while being pushed through the apparatus; to provide an apparatus by means of which tubes may be automatically fed or pushed through the apparatus and the bending means operated by the action of the tube; to provide an automatic, hydraulic apparatus by means of which tubes may be bent without fracturing the same; to provide an apparatus by means of which the ends of tubes may be bent or turned to the proper angle and in varying degree while the said tubes are being pushed through the apparatus; to provide a simple, compact, and effective apparatus by means of which cold tube bending may be effected automatically, and while the tube is being pushed through the apparatus in a horizontal plane, both the pushing and bending being positive; and to provide various details of construction of a tube bending apparatus whereby the machine is simplified, the work rendered effective, and the functions produced rapidly and automatically.

With the above objects in view, and others which will be disclosed during the course of this description, my invention consists in the parts, features and elements and combinations of elements and mechanisms hereinafter described and claimed.

In order that my invention may be clearly understood, I have provided drawings illustrating a form of my invention, as at present contemplated, calculated to produce the results desired, and in said drawings: Figure 1 illustrates in top plan the entire apparatus, the figure being in two parts owing to the length of the apparatus being too great for the sheet; Fig. 2 is a side elevation of the apparatus complete, the figure being in two parts as in Fig. 1; Fig. 3 is an elevation of the tube bending end of the apparatus; Fig. 4 is a partial section and elevation of one of the cylinder heads of the apparatus; Fig. 5 is a section taken on the line 5—5 of Fig. 4; Fig. 6 is a partial section and elevation of what may be termed the front cylinder head; Fig. 7 is a section on the line 7—7 of Fig. 6; Fig. 8 is a partial section and elevation of the piston crosshead, including the guide-bar and support; Fig. 9 is a top plan view of the tube-supporting block and its carrier; Fig. 10 is an end elevation of the parts shown in Fig. 9, with the addition thereto of the auxiliary piston rod; Fig. 11 is a side elevation of the parts shown in Fig. 10; Fig. 12 is a top plan view of the forming block; Fig. 13 is a front elevation of the forming block; Fig. 14 is an end elevation of the forming block; Fig. 15 is a diagrammatic view illustrating the form of the groove in the forming block and showing the difference in the radii of the halves of the groove of said block; Fig. 16 is an elevation of one of the cylinder supports; and Fig. 17 is an elevation of the bed-plate and its integral cylinder support.

Referring to the drawings, it should be primarily understood that the apparatus can be constructed to operate upon and bend practically any length of pipe or tube, and tubes or pipes of substantially any diameter.

The bed-plate of the apparatus is indicated by the numeral 1, which may be mounted upon and bolted to any suitable supports such as are indicated by 2, said bed-plate being enlarged at one end and provided with an integral support or bearing 3 for power cylinders. Extending longitudinally of the bed-plate is a dove-tail groove 4, in which moves a fulcrum-block 5, which carries a fulcrum-post 6, the object of which will be presently described. At its enlarged end said bed-plate is provided with another dove-tail groove 7, in which slides a carrier 8, for the support of a guide-block, which will be presently described, the two grooves 5 and 7, in said bed-plate being parallel to each other, and the shorter one 7, being arranged close to the cylinder support and transversely to the feed of the pipe through the apparatus. Another cylinder support 9, is arranged at a distance from the bed-plate, the same being securely bolted to a suitable standard 10, and said support being provided with substantially semi-circular recesses 11, in which the cylinders are supported, and with adjacent recesses 12, through which certain of the cylinder-head tie-bolts pass. Still another support 13, is provided at a distance from the cylinder support 9, and bolted to the standard 14, said support 13 aiding in the support of the guide-bar 15, the forward end of which is bolted at 16 to the center of the cylinder support 9, and the rear end of which is carried by the support 17, bolted to the standard 18. As shown in Fig. 17, the forward cylinder support 3 is formed integral with the bed-plate, thus giving strength and rigidity to the structure; and in Fig. 16, the rear cylinder support 9 is shown in detail.

The power cylinders are indicated by 19, the same being supported at opposite ends by the cylinder supports 3 and 9, respectively, and the heads of the cylinders being bolted to each other and held in position by a series of bolts 20, grouped about the several cylinders so as to firmly tie the latter and secure rigidity of construction. The construction of the rear cylinder-heads 21 is shown in detail in Figs. 4 and 5, and, referring particularly to these figures, it will be seen that the cylinder-head is centrally bored at 22 for the passage of the piston-rods presently described, said bore being enlarged as at 23, for the reception of the bearing 24, flanged at 25, and secured to the head 21, by means of bolts 26, and nuts 27. The bolts 26 are tapped into the head 21, and are provided with a smooth body-portion 28, and an outer screw-threaded end, upon which the nuts 27 are set. The flange 25 of the bearing 24, is bored at 29 for the passage of the bolts 26, so as to allow said bearings to have freedom of movement on said bolts. This construction provides for the application of suitable packing in the enlargement 23 of the bearing 22, so as to make a fluid-tight joint. A port 30, is provided in the head 21, extending from its periphery to a point near the central bore 22, at which point it communicates with the passage 31, extending parallel with the cylinder 19, and communicating with the latter. The port 30, at its outer end, is screw-threaded as at 32, for the reception of the screw-threaded end of the fluid conduit presently described. The vent-port $a$ is closed by the screw-plug $a'$. Each cylinder 19, consists of the outer steel-pipe and the inner brass-pipe 33, and a filling 34, of brimstone, this construction not only strengthening the cylinders and giving great stability thereto, but the filling having the function of absorbing the heat generated and acting as a non-conductor, thus keeping the outer steel-pipe 19, cool. This filling material is an important feature of my invention, since it is practically non-compressible, and will not melt or fuse at the temperature of steam at atmospheric pressure, but may be fused and rendered limpid, so as to be run out, in the event of it being necessary to separate the outer and inner cylinders. Hence, this brimstone filling has been selected with special reference to its inherent characteristics which I have discovered and noted above and which render it an important element in my apparatus. The cylinders 19, at their front ends, are each supported in the circular heads 35, the details of which are shown in Figs. 6 and 7. Each of the heads 35 is centrally bored as at 36, thus providing a chamber beyond the end of the cylinder for the reception and inflow of the fluid operating upon the piston-heads, the port 37, admitting the fluid directly to said chamber. The lower end of the port 37 is screw-threaded, as at 38, for the reception of the screw-threaded end of the fluid conduit presently described. The vent-port $b$ will be closed by a screw-plug inserted in the screw-threaded end $b'$. The several bolts 20, which are grouped around each of the cylinders are passed, respectively, through the heads 21 and 35, and firmly held in said heads by the nuts 39. Thus, the cylinder heads are securely tied together and the cylinders are held rigidly in place. The piston-heads operating within the cylinders 19 are not shown in the drawings, but may be of any suitable construction, and each of said heads is connected to a piston-rod 40, each of which rods is secured at its other end to the crosshead 41, the details of which are shown in Fig. 8. This crosshead is braced by a rearwardly extending angle-bar 42, connected to the ends of the crosshead 41 by means of the integral, tubular portions 43, through which the piston rods pass and in which said piston rods are securely held by the screws 44, tapped through said tubular portions and against the rods. Hence, the said screws will act to prevent the piston-rods from sliding through the crosshead on the return stroke of said rods. Nuts 44ª are secured to the outer ends of the piston-rods so as to take the pulling strain during the forward movement of the said piston-rods. The crosshead and brace-bar are strengthened centrally by the connecting portion 45; and said crosshead is provided with the central base 46, extending at a right-angle to the crosshead and provided with the longitudinal groove 47, which receives the guide-bar 15, the said crosshead thus being guided by said bar. From the construction thus described, it will be seen that the crosshead is guided centrally on the bar 15, and that the latter is securely held in position by the supports 9, 13 and 17, and that said pistons, with their heads, operate in the cylinders 19, which latter are securely held and braced by the supports 3 and 9. The cylinders 19 are spaced apart sufficiently to permit the insertion between them of the pipe or tube to be bent, the said pipe being represented by dotted lines in Fig. 1, and indicated by 48. The support 3, for the forward end of the cylinders is formed, between the cylinder-heads, with the semicircular portion on which the pipe may rest at one end, said pipe at its opposite end being received upon the circular support 49, arranged centrally of the crosshead 41, the said crosshead and support 3 thus operating to position or locate the pipe or tube to be bent centrally between the cylinders, so that the same may be pushed through the apparatus into position such that it may be bent by the means now to be described.

As previously stated, the carrier 8 slides in groove 7, and upon this carrier is pivoted the supporting-block 50, (the details of which are shown in Figs. 9 to 11) the pivotal pin of which is indicated by 51, extending from its bottom into the carrier 8. This supporting-block 50 is provided in its face with a pipe-receiving groove, the curvature of which is preferably produced from different centers; that is to say, the upper half 52, of said groove, is struck from the center 53, while the lower half 54 of said groove is struck from the center 55, the terminals of the arcs at one end being joined at the point 56, which produces a groove in the face of the block of a slightly prolate character. The object of this will be presently described. The guide-block is provided with a rear vertical wall indicated by 57, against which impinges the outer rounded end of the auxiliary piston-rod 58, screwed into the standard 59, erected on the carrier 8 in rear of the supporting-block 50, said piston 58, carrying a head operating within the auxiliary cylinder 60, the heads 61, of which may be of substantially the same form as the heads 21 and 35, respectively, of the other cylinders, said heads having their supports in the extension 62 of the enlarged end of the bed-plate 1, see Fig. 3. It will be noted that the end of the piston 58, which impinges against the supporting-block 50, operates on the latter substantially in the line of the center of the groove of said supporting-block, thus creating its pressure upon the latter at a considerable distance above its pivotal point, thus preventing any strain from occurring on said pivot at a right-angle to its length. However, the supporting-block is pivoted for the purpose of having a slight lateral movement relatively to the pipe guided by it, so as to compensate for the strain brought to bear upon it by the pipe in its passage through the apparatus, and while its end is being bent, and also to compensate for the irregular alinement of said pipe. It will be seen from the construction just described that the supporting-block 50 may be caused to slide or reciprocate in the way or groove 7, so as to provide the requisite support for the pipe at one side, and thus counterbalance the strain or pressure necessarily brought to bear thereon while the bending operation is in progress.

A forming-block 63 is set parallel to the guide-block on the opposite side of travel of the pipe or tube 48. The details of this forming block are shown in Figs. 12 to 14, and therein it will be seen that said block has extending from its bottom a pivotal pin 64, which is set in the bed-plate 1 of the apparatus, see Figs. 1 and 3, and that its face is grooved for the guidance of the pipe or tube 48 in its passage through the apparatus. The curvature of the groove of the forming-block may be a true semi-circle, but preferably is struck from two different centers, the upper half 65, of the groove, being struck from the center 66, while the lower half 67, of the groove is struck from the center 68, the inner terminals of these arcs being joined at the point 69, and thus making the guiding groove in said block 63 slightly prolate. This is more particularly shown in the enlarged diagrammatic view of Fig. 15, which diagram also helps to illustrate the formation of the groove in the supporting-block 50. By pivoting the forming-block as described, the same is allowed to yield transversely to the path of the pipe or tube 48 through the apparatus, and thus conform, to a certain extent, to the movement of the pipe under the bending strain, but, at the same time, operating as a fulcrum and shaper over or around which the bend of the pipe is formed. The forming-block is provided with the lateral extension 70, in which the groove is extended, said extension operating directly opposite the supporting-block 50, and thus coöperating with the same, and forming a greater bearing for the tube or pipe 48, and enabling the said forming-block to receive a great portion of the strain brought to bear upon the pipe in the bending operation, and preventing said bend from being too abrupt. Furthermore, this extension, during the operation of the apparatus, will be forced over into contact with the supporting-block, thus preventing said forming-block from being carried too far around during the bending operation, thus compelling the forming-block to maintain in the pipe the radius of the bending lever during the bending operation.

The means for performing the bending operation are illustrated in Figs. 1 and 3, and referring thereto, particularly, it will be seen that the bending-lever 71, has its pivotal movement upon the fulcrum-post 6, previously described, and that said bending-lever at its free end is forked for the reception of the yoke 72 pivoted on the bolt 73, extending between the prongs of said forked portion. Guided in the yoke 72 is the bending-block 74, provided with the semi-circular pipe or tube-receiving groove 75, and capable of adjustment within the yoke 72 by means of adjusting-screw 76, swiveled in said bending-block, extending rearwardly therefrom and through the yoke 72, and provided at its rear end with a hand-wheel 77, and the center key 78, either of which means may be used for the purpose of adjusting the bending-block 74, in the yoke 72, to accommodate the position of the pipe or tube to be bent, and the size of the latter. From the construction just described, it will be seen that the bending-lever 71, fulcrums on the post 6, which latter is carried by the slide 5 in the groove 4 of the bed-plate 1, and that the block 74, carried in the yoke 72, will embrace one side of the pipe or tube which is to be bent.

In order to feed or push the pipe or tube through the apparatus, the piston heads of the rods 40, are operated upon by the fluid, which is conveyed to the cylinders 19 through the respective heads of the latter, the system of conduits for the same being shown in Fig. 2, wherein 79 indicates the four-way cock, the supply-pipe for the fluid being indicated by 80, and the conduit 81 leading to one of the cylinder-heads 21, and the conduit 82 leading to one of the cylinder-heads 35, and 83 being an outlet. Conduits 81ª and 82ª, at opposite ends of the cylinders, connect respectively with the conduits 81 and 82, and extend respectively to the other pair of cylinder-heads 21 and 35. In this manner, the fluid is conveyed to opposite ends of the cylinders, and, consequently, to opposite sides of the piston-heads within said cylinders, the pressure, in consequence, being capable of being applied to opposite sides or ends of said piston-heads, so as to cause the latter to travel in opposite directions within the cylinders, as required. Fluid is also conveyed to the auxiliary cylinder 60 by means of the four-way cock 84, the conduit to which is indicated by 85, and from which the conduits 86 and 87 convey the fluid to the respective heads of the said cylinder 60, thus enabling the pressure to be applied to opposite sides of the head carried by the piston 58, in order to advance and retract the guide-block 50, as required.

Having thus described the details of construction of my invention, the mode of operation will be readily understood from the following brief description thereof. Referring to Figs. 1 and 2, it will be seen that the tube to be bent, which is indicated by 48, will be placed so as to be supported at one end on the circular support 49 of the crosshead and its other end on the semi-circular support 3 of the cylinder support. In this manner, the tube to be bent is centrally located and its path of travel is determined. The fluid will now be conveyed to the cylinders 19 and will pass through the conduit 81 to the rear heads 21 of the cylinders, thus creating pressure upon the rear end of the piston-heads connected to the piston-rods 40. Thus, the tube will be pushed or fed along between the cylinders 19 by means of the crosshead 41, and the forward end of said tube will be passed into coöperation with the supporting-block 50, the forming-block 63, and the yoke 72 of the bending-lever 71. The forming-block, as the bending action takes place, will operate as a fulcrum around which the bend in the tube will take place, while the supporting-block will operate with pressure upon the opposite side of the tube from that of the forming-block, and, in order to create this pressure, fluid will be conveyed to the cylinder 60 through the four-way cock 84 and the conduit 86 to the rear head 61 of said cylinder, thus creating the pressure on the outer end of the piston-head carried by the piston-rod 58 which, at its forward end, bears upon the vertical wall 57 of the guide-block 50. The pressure thus created upon the tube which is being bent overcomes any tendency of said tube to leave its direct path of travel through the apparatus and at the same time braces the said tube during the bending action so as to prevent the excessive strain thereon from buckling or bending the tube at any point, except around the fulcrum of the forming-block 63. As the tube is fed through the apparatus and embraced on opposite sides by the forming-block and supporting-block, respectively, the end of the tube will pass into engagement with the yoke of the bending-lever 71, which latter will immediately move about its fulcrum 6 in the bed-plate, thus creating a bending strain upon the end of the tube and causing said tube to be bent in the arc of a circle determined by the position of the bending-lever and the fulcrum-block. In order to create the requisite amount of pressure on one side of the tube to be bent, the yoke-block 74 of the bending-lever 71 is made adjustable and is brought into engagement with the said tube by means of either the hand-wheel 77, or a crank applied to the key-end 74 of the screw 76. Thus, irrespective of the size of the tube which is to be bent, the yoke can be made to embrace the same and obtain an effective grip for the bending function. The bending-lever may be adjusted longitudinally of the bed-plate, in order to give the same an initial position with reference to the tube to be bent and according to the size of the latter; and, in order to hold the adjustment of said bending-lever, metal bars of varying sizes may be employed, one of which is shown at 5ª, Fig. 3, said bars being placed in the slot 4 of the bed-plate so as to limit the inward movement of the slide 5, it being obvious that the strain upon said slide, during the operation of the bending-lever, is in the direction of the pipe which is being bent. Hence, no holding means are required in rear of the said slide. The supporting-block is pivotally supported by its slide or carrier so as to have slight lateral movement on its pivot to compensate for the action of the tube under the bending strain; and, likewise, the forming-block is fulcrumed to the bed-plate so as to have a slight lateral movement on its fulcrum to compensate for the action of the tube under the bending strain. The forming-block and the guide-block are arranged opposite to each other and embrace opposite sides of the tube to be bent, and the forming-block is provided with an extension 70 which is arranged directly opposite the guide-block, the forming-block thus being given an extensive bearing on one side of the tube to be bent. The piston-rods of the feeding mechanism are joined at their outer ends by the crosshead 41, so that the said rods may be moved uniformly and so that a positively uniform and steady feeding action may be given the tube to be bent. To prevent any possibility of lateral strain upon the piston-rods during the feeding action, the crosshead is guided in its operation by the guide-bar 15 and the coöperating base-portion 46, which embraces said guide-bar 15.

After the tube has been fed or pushed through the apparatus to the required extent, and the end or a portion bent to the desired degree, the crosshead is retracted or returned to its normal position, shown in Fig. 1, by causing the fluid to pass through the conduit 82 to the opposite ends of the cylinders, or to the heads 35, thus producing the pressure upon the front end of the piston-heads and causing the same to be pushed back to the outer end of the cylinders 19. From this description, it will be seen that, when the pressure is applied to the piston-heads to produce the feeding action of the crosshead, the operation of the apparatus is entirely automatic until the feeding action ceases and that the pipe being bent, during its feed movement, causes the bending mechanism to perform its functions.

I have referred to operating the several pistons by fluids, and I intend thereby to indicate that fluids of any kind may be employed ordinarily; but, in some instances, as in bending heavy pipes, liquids only will be found practicable, because not so compressible as other fluids, since it is essential to have positiveness and steadiness of action and pressure for the several purposes.

It should be understood that, in bending tubes of all kinds, there is a natural tendency for the tubes, during the bending action, to collapse or become oval at or about the bend, and this action will take place in a plane at a right-angle to the direction of the bend. Hence, it is the special function of the supporting and forming blocks to overcome such tendency and maintain the true circular shape of the pipes. Said blocks are enabled to perform this function owing to the particular curvature given the guiding grooves as described. Therefore, the form of the guiding grooves in the two said blocks is an important feature of my invention upon which I desire to lay stress.

Another important feature of my invention resides in the fact that, by my construction, I am able to bend tubes in a horizontal plane, thus rendering it possible to bend very long lengths, the common practice heretofore having been to bend said tubes in a vertical plane which limited the apparatus to bending tubes of comparatively short lengths.

Having thus described my invention, what I claim and desire to secure by Letters Patent is:

1. A tube-bending apparatus having in combination a bed-plate; tube-bending means arranged in a horizontal plane and pivoted to the bed-plate, said means comprising a lever carrying at its free end a yoke for embracing the tube to be bent; a supporting-block for embracing one side of the tube to be bent arranged on a vertical axis; a forming-block embracing the opposite side of the tube to be bent and arranged on a vertical axis; and means for feeding the tube relatively to the forming-block and supporting-block and into coöperation with the yoke of the said lever, whereby the latter will be actuated by the tube as it is being fed through the apparatus.

2. A tube-bending apparatus having in combination tube-bending means; tube-feeding means; a supporting-block for embracing one side of the tube; a forming-block for embracing the other side of the tube, the said two blocks being arranged between the feeding means and the bending means and supported upon journals permitting them to have vibratory motion in a horizontal plane.

3. A tube-bending apparatus having in combination tube-feeding means; tube-bending means; and a forming-block for embracing one side of the tube, and arranged between the tube-bending and feeding means, said forming-block being pivotally supported so as to have slight movement in a horizontal plane relatively to the tube with which it coöperates.

4. A tube-bending apparatus having in combination tube-bending means; tube-feeding means; a supporting-block arranged between the two said means; and means for automatically pressing the supporting-block with the requisite amount of pressure against one side of the tube during the bending operation.

5. A tube-bending apparatus having in combination tube-feeding means; tube-bending means; a supporting-block arranged between the two said means; said supporting-block being pivotally supported so as to have slight movement in a horizontal plane relatively to the tube with which it coöperates; and automatic means for pressing the supporting-block with the requisite pressure against one side of the tube during the bending operation.

6. A tube-bending apparatus having in combination means for bending a tube; means for feeding a tube to the bending means; and a supporting-block coöperating with the tube-feeding and tube-bending means, said supporting-block being formed with a groove for receiving the tube to be bent, the curvature of the groove being formed by joining two arcs of a circle struck from different centers.

7. A tube-bending apparatus having in combination tube-bending means; tube-feeding means; a forming-block for engaging the tube coöperating with said bending and feeding means, the forming-block being provided with a groove for receiving the tube, the curvature of said groove being formed by joining the arcs of circles of different radii.

8. A tube-bending apparatus having in combination means for bending a tube; means for feeding the tube; a forming-block and a supporting-block, both coöperating with the feeding and bending means; each of said blocks being provided with a groove for receiving the tube, the curvature of said groove being formed by joining the arcs of circles of different radii.

In testimony whereof I have hereunto signed my name in the presence of two subscribing witnesses.

GEORGE H. REYNOLDS.

Witnesses:
FLORENCE ATEN IVES,
CHAS. McC. CHAPMAN.

---

Copies of this patent may be obtained for five cents each, by addressing the "Commissioner of Patents, Washington, D. C."